United States Patent [19]

Bregenzer

[11] Patent Number: 4,610,747
[45] Date of Patent: Sep. 9, 1986

[54] PROCESS FOR STEPWISE HEATING UP METALLIC STRIPS OR FOILS

[75] Inventor: René Bregenzer, Neuhausen, Switzerland

[73] Assignee: Swiss Aluminium Ltd., Chippis, Switzerland

[21] Appl. No.: 712,519

[22] Filed: Mar. 18, 1985

[30] Foreign Application Priority Data

Mar. 23, 1984 [CH] Switzerland .................. 1476/84

[51] Int. Cl.⁴ ............................................. B32B 31/08
[52] U.S. Cl. ................................. 156/322; 29/33 S;
156/324; 156/549; 156/555; 156/583.1
[58] Field of Search ............... 29/33 S; 156/322, 547,
156/549, 555, 583.1, 324

[56] References Cited

U.S. PATENT DOCUMENTS 3,769,138 10/1973 Robbiati .................. 156/322 X
4,180,427 12/1979 Bertsch .................. 156/322 X
4,284,457 8/1981 Stonier et al. ............ 156/322 X
4,487,641 12/1984 Bohannon et al. ........... 156/555 X

FOREIGN PATENT DOCUMENTS 857845 12/1970 Canada .

Primary Examiner—Robert A. Dawson
Attorney, Agent, or Firm—Bachman & Lapointe

[57] ABSTRACT

Metal strips or foils more than 800 mm wide are brought to an end temperature of 100°–300° C. by stepwise heating. The strips or foils are deflected at an angle ($\alpha$) of 15°–150° C. over 2 to 6 rolls set at increasing temperatures in the direction of throughput, at least the last roll having a double outer layer that can be heated, and the last roll being set at the final, desired temperature. The increases in temperature from one roll to the next lie between 20° and 70° C., preferably between 50° and 60° C. Usefully all the increases are the same. The process according to the invention is employed in the manufacture of composites and in the laminating and lacquering or painting of metal strips or foils.

10 Claims, 2 Drawing Figures

PROCESS FOR STEPWISE HEATING UP METALLIC STRIPS OR FOILS

BACKGROUND OF THE INVENTION

The invention relates to a process for stepwise heating metallic strips or foils of more that 800 mm in width to an end temperature of 100° to 300° C. Furthermore, the invention relates to the use of this process in the manufacture of composites and in the laminating and lacquering or painting of metallic strips or foil.

Known from the Canadian Pat. No. 857 845 is a process for manufacturing flat building panels made up of a relatively thick core of thermoplastic plastic and relatively thin outer layers of metal. In that process aluminum sheets, for example 0.3 mm thick, are pressed by a pair of rolls heated to 70° C. onto a core layer which is still hot and bears a molten adhesive film on the surface. Before making contact with the core layer, the cold metal strips are heated to 70° C., at maximum, by the pre-heated rolls. Experience shows that such laminates have a relatively strong tendency to form wrinkles when subsequently worked, especially after cooling.

A known method to avoid such wrinkles in composite panels is to heat the metal strips before laminating, using infra-red radiation, gas flame or hot air for that purpose.

Thus, according to the Swiss Pat. No. 478 652 use is made of a continuous throughput furnace with three successive heating zones for heating up, holding the metal strip at temperature and cooling down. It turns out that regulating the temperature profile accurately over the width of the strip is extremely difficult.

The Swiss Pat. No. 478 652 exhibits therefore the following disadvantages, as do the other known heat sources for heating up strip or foil:
poor thermal efficiency
danger of overheating if the continuous process is suddenly stopped e.g. in emergency
for high production rates one requires voluminous machine elements which are expensive to purchase and maintain
with wide sheets the temperature distribution over the width is inexact, varying by 2° to 5° C.

The object of the present invention is therefore to develop a process for stepwise heating-up metallic strips or foils of width more than 800 mm to an end temperature of 100° to 300° C. such that a uniform temperature in the range of $\leq \pm 1°$ C. is assured over the whole width of the strips, and that a low investmentoutlay for the device and modest running costs are possible. The process should be widely applicable.

SUMMARY OF THE INVENTION

The foregoing object is achieved by way of the invention wherein the strips or foils are deflected at an angle of 15°–150° over 2 to 6 rolls set at increasing temperatures in the direction of throughput, at least the last roll having a double outer layer that can be heated, and the last roll being set at the final, desired temperature.

Surprisingly, with the process according to the invention it is possible to overcome the prejudice of the experts in the field who consider rolls unsuitable for heating up wide metal strips or foils because the strips and foils tend to twist and wrinkle due to the jump in temperature and suffer chafing as a result.

Compared with other thermal sources rolls have the great advantage that they must only reach practically the same temperature as the strips or foils to be heated and not significantly higher temperatures.

The equipment-aided simplification for carrying out the process according to the invention is such that, for example, only 2 to 6, preferably 2 to 4 rolls have to be installed and operated instead of expensive and voluminous air-circulation furnaces.

The steps in roll temperature, increasing in the direction of movement of the strip, are preferably 20°–70° C. and usefully all equal. Roll temperature increases of 50°–60° C. have proved to be optimal in particular from the economic standpoint, again the magnitude of all steps being the same. Preheated rolls with, as viewed in cross-section, a ring-shaped peripheral space near the surface for the heating medium satisfy the requirements; they produce temperature variations at the surface which are always $\leq \pm 1°$ C. The peripheral space is usefully divided by two spiral-shaped ribs in such a manner that the heating medium runs counter flow (supplier Eberhard Derichs; Krefeld-Fischeln, Western Germany). Stepwise preheated metal strips do not therefore suffer from local distortion or chafing.

The angle at which the strips or foils are deflected over the rolls is usefully in the range 60° to 120°. Larger deflecting angles have the advantage of longer contact with the roll and therefore equilibration of the temperature of roll and strip or foil. However the longer contact time increases the danger of chafing.

In practice the expert sets the deflection angle according to other parameters such as, for example, strip material, strip thickness, roll temperature, roll diameter, running speed and space available.

The process according to the invention can be applied to a wide range of strip and foil thicknesses; in practice the strips and foils are mainly 0.05–1 mm thick, in particular 0.05–0.03 mm. They can be pre-treated e.g. by deposition of a conversion coating on them, or not.

Metallic strips and foils have been successfully tested on an industrial scale up to width of 1500 mm. No wrinkles or folds were observed in the finished product.

One of the most important applications of the process according to the invention is preheating the surface layer/layers of 1–20 mm thick plastic cores and at least one metal top layer in the continuous manufacture of composites. Furthermore, metallic strips and foils can be preheated and laminated with plastic foil and/or paper on at least one side. Finally, the process according to the invention can be employed for baking lacquer or paint deposited on at least one side of metallic strips or foils.

BRIEF DESCRIPTION OF THE DRAWINGS

The invention is explained in the following detailed description with the aid of schematic drawings wherein.

DETAILED DESCRIPTION

Figure 1:
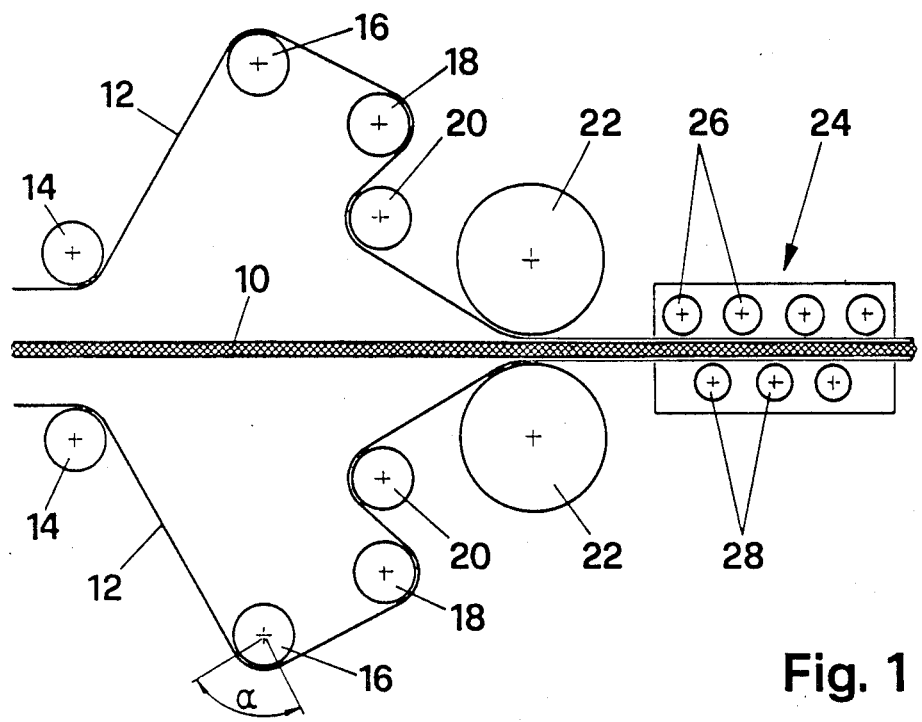
FIG. 1 is a unit for stepwise preheating of two metal strips and subseqeuntly producing composite panels.

In FIG. 1 a 5 mm thick core layer 10 of thermoplastic plastic (polyethylene, polyvinylchloride etc.) is clad on both sides with metal strips 12. In practice strips and foils 1500 mm wide and up to 0.25 mm thick have been employed on this unit:
steel: 0.2×1200 mm aluminum: 0.25×1500 mm
stainless steel: 0.15×1000 mm The strips or foils 12 are first deflected by rolls 14 away from the core layer 10, then each over three rolls 16, 18, 20 which have been heated to 70° C. (roll 16) 120° C. (roll 18) and 170° C. (roll 20), in each case with a deflection angle ($\alpha$) of 90°, to the laminating roll 22 which has been heated to 220° C. The rolls 16, 18, 20 are all 250 mm in diameter, the laminating roll 500 mm in diameter.

The metal strips 12 are bonded to the core 10 between the laminating rolls 22 under the action of pressure and heat. Using additional conventional, facilities an adhesive foil can be introduced between the core layer 10 and the strips 12.

To ensure that the resultant composite strip will be absolutely flat, it is passed through a set of rolls 24, which are the subject of the U.S. Pat. No. 3,660,207. The upper rolls 26 and the lower rolls 28 are displaced horizontally with respect to each other so that each is facing a gap and are such that with respect to the direction of throughput the first rolls 26, 28 can be heated and the last of the rolls 26, 28 can be cooled.

Figure 2:
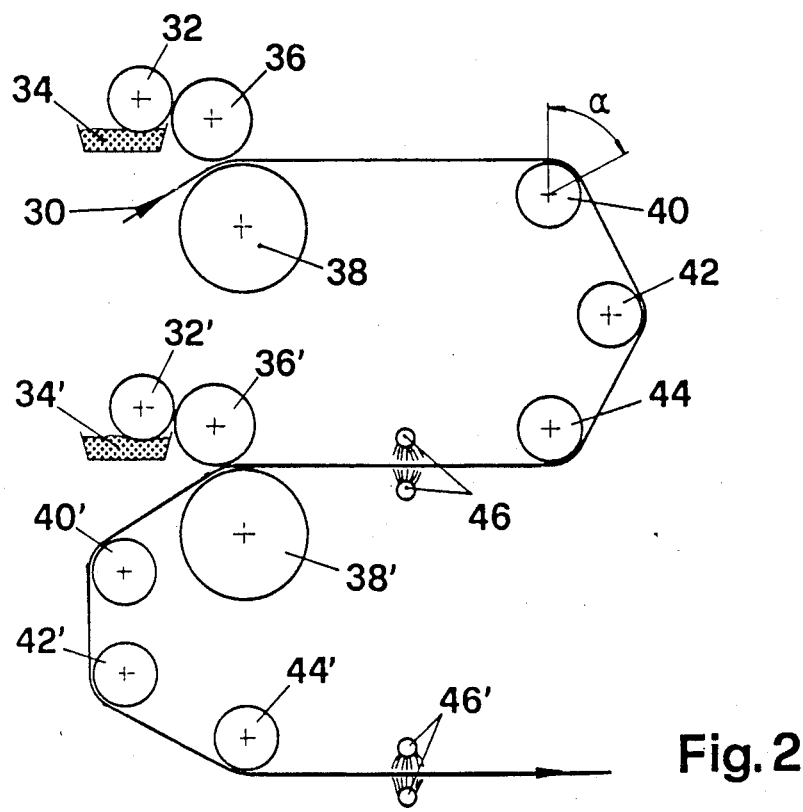
FIG. 2 is a unit for lacquering a metal foil on both sides, with subsequent stepwise heating.

The lacquering or painting unit shown in FIG. 2 has a 0.05 mm thick aluminum foil 30 passing through it. A first roll 32 dips into a first bath of lacquer 34 and transfers the lacquer via a first contact roll 36 to one side of the aluminum foil which runs over deflection roll 38. This deflection roll 38 is at a temperature of 60° C.

The non-lacquered side of the aluminum foil 30 runs over three further rolls 40, 42, 44 in each case with a deflection angle ($\alpha$) of 60°. The roll 40 is at a temperature of 130° C., roll 42 at 200° C. and roll 44 at 270° C. The three rolls 40, 42 and 44 are 250 mm in diameter, deflection roll 38 is 400 mm in diameter.

After passing roll 44 the aluminum foil is jetted on both sides with cold compressed air or cold water emerging from nozzles 46. According to one version a cooling roll (room temperature) is used instead of the nozzles 46.

The other side of the aluminum foil is coated with lacquer, preferably the same lacquer, from a second bath 34'. The second deflection roll 38' and the second set of rolls 40', 42' and 44' are at the same temperature, the same deflection angle ($\alpha$) and the same diameter as the corresponding deflection roll 38 and rolls 40, 42 and 44. Again cold compressed air or cold water is blown or sprayed from nozzles 46' onto the aluminum foil, as a result of which it is cooled to room temperature.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the stepwise heating of a metallic strip having a width of at least 800 mm so as to prevent the formation of wrinkles on said strip to a final temperature of about between 100° to 300° C. comprising providing a plurality of rolls, arranging said plurality of rolls such that said metallic strip is deflected over each of said plurality of rolls at an angle of about between 60 to 120 degrees, heating said plurality of rolls such that the temperature of said plurality of rolls increases in the direction of metallic strip throughput from about between 20° to 70° C. from roll to roll wherein the last of said plurality of rolls is heated to the desired final temperature of said metallic strip, and passing said metallic strip having a width of at least 800 mm over said plurality of rolls.

2. A process according to claim 1 including heating said plurality of rolls such that the difference in temperature between successive rolls is substantially the same.

3. A process according to claim 1 including heating said plurality of rolls such that the temperature between successive rolls of said plurality of rolls is from about 50° to 60° C.

4. A process according to claim 3 including heating said plurality of rolls such that the difference in temperature between successive rolls is substantially the same.

5. A process according to claim 1 including heating said plurality of rolls such that said plurality of rolls exhibit temperature variations on their work face of less than or equal to ±1° C.

6. A process according to claim 1 including laminating said heated metallic strip to a core so as to form a composite.

7. A process according to claim 6 including providing a plastic core.

8. A process according to claim 6 including providing a paper core.

9. A process according to claim 6 including painting said metallic strip prior to laminating to said core.

10. A process according to claim 6 including lacquering said metallic strip prior to laminating to said core.

* * * * *